United States Patent [19]

Jones

[11] Patent Number: 5,472,772
[45] Date of Patent: Dec. 5, 1995

[54] METHOD FOR WELDING STACKER LAMINATIONS AND ARTICLE THEREFROM

[75] Inventor: Marshall G. Jones, Scotia, N.Y.

[73] Assignee: General Electric Company, Schenectady, N.Y.

[21] Appl. No.: 228,765

[22] Filed: Apr. 18, 1994

[51] Int. Cl.$^6$ .................................................. B32B 23/02
[52] U.S. Cl. ..................... 428/192; 428/194; 428/195; 428/198; 428/209; 428/411.1; 428/457; 219/136
[58] Field of Search ...................................... 428/192, 195, 428/457, 615, 194, 198, 209, 411.1; 219/136

[56] References Cited

U.S. PATENT DOCUMENTS

| | | | |
|---|---|---|---|
| 3,922,517 | 11/1975 | Nelson et al. | 219/61 |
| 4,114,019 | 9/1978 | Sandor | 219/137 R |
| 4,461,945 | 7/1984 | O'Cheskey et al. | 219/121 LC |
| 5,276,298 | 1/1994 | Jones et al. | 219/124 |

OTHER PUBLICATIONS

"Laser Welding Improves Stator Performance", Industrial Laser Review, Jan. 1993, pp. 7–8.

Primary Examiner—Patrick J. Ryan
Assistant Examiner—William A. Krynski
Attorney, Agent, or Firm—Paul R. Webb, II

[57] ABSTRACT

A method for welding a plurality of stacked laminations includes positioning an edge of the laminations adjacent to a pulsed laser for receiving a pulsed laser beam at the kerf defined between adjacent laminations. The laser is operated to direct the pulsed laser beam at the kerf for melting the adjacent laminations to a predetermined maximum depth. The laser is controlled to limit heat input at the kerf for effecting a generally parabolic melting zone. The stacked laminations 10 are moved transversely edge-to-edge relative to the pulsed laser beam for repeating the pulsed welding at successive kerfs.

3 Claims, 2 Drawing Sheets

METHOD FOR WELDING STACKER LAMINATIONS AND ARTICLE THEREFROM

The present invention relates generally to laser welding, and, more specifically, to welding of stacked laminations using a pulsed laser.

BACKGROUND OF THE INVENTION

Electromagnetic devices such as motors, generators, magnets, and solenoids, use stacked laminations made from silicon-iron (Si—Fe) for example for providing efficient flux paths for the operation thereof. The laminations must be suitable stacked together either using mechanical fasteners or by welding. Exemplary mechanical fasteners include straps, keys, and rivets suitable positioned in the laminations for holding them together. However, the laminations are typically pre-machined for accepting the mechanical fasteners such as by being punched or providing apertures therefor, which premachining induces stress in the laminations. A pulsed annealing operation is therefore typically required for reducing the residual stresses for minimizing magnetic core losses therefrom. The location of the fasteners themselves may also lead to inefficient flux paths within the laminations decreasing the efficiency of the device.

Welding, on the other hand, necessarily heats the laminations which adversely affects the magnetic properties thereof and may distort the laminations. This may require a pulsed-heat treatment to reclaim the lost magnetic properties and remove the distortions.

Conventional TIG welding is one process known to provide excessive heat into the laminations necessarily requiring the pulsed-heat treatment thereof. Excessive heat input into the laminations may also cause physical distortion thereof which must be suitably corrected in order to obtain a satisfactory product.

It is also known to use a conventional $CO_2$ laser for welding stacked laminations for reducing the heat input thereto and reducing both thermal distortion thereof and the degradation of magnetic properties therein. However, $CO_2$ lasers when conventionally used for welding are typically operated as continuous-wave lasers and therefore continuously input heat into the welded member although such heat input is significantly less than that from conventional TIG welding. Continuously applied welding heat and the resulting continuous, substantially uniform weld bead may still degrade the magnetic properties of the laminations from excessive heat.

SUMMARY OF THE INVENTION

A method for welding a plurality of stacked laminations includes positioning an edge of the laminations adjacent to a pulsed laser for receiving a pulsed laser beam at the kerf defined between adjacent laminations. the laser is operated to direct the pulsed laser beam at the kerf for melting the adjacent laminations to a predetermined maximum depth. The laser is controlled to limit heat input at the kerf for effecting a generally parabolic melting zone. The stacked laminations are moved transversely edge-to-edge relative to the pulsed laser beam for repeating the pulsed welding at successive kerfs.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT

Figure 1:
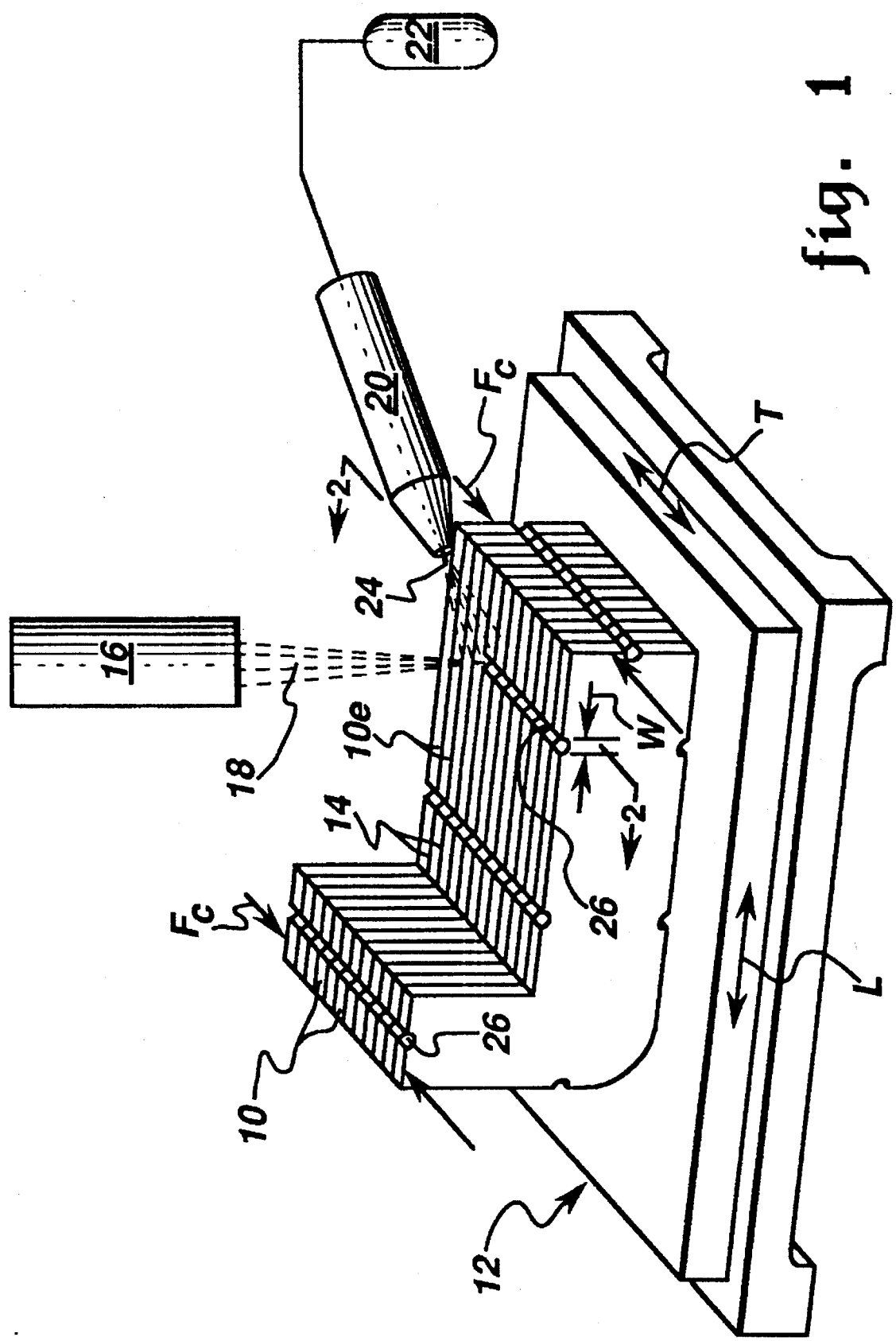
FIG. 1 is a schematic representation of stacked laminations for an electrical solenoid disposed on a carriage for being moved relative to laser for forming a weld bead along the edge thereof.

Illustrated schematically in FIG. 1 is a plurality of exemplary laminations 10 which have identical configurations for use in an exemplary electrical solenoid. The laminations may be made of any suitable material such as silicon-iron (Si—Fe) and are conventionally coated with a suitable electrical insulator. In order to permanently join together the stack of laminations, they are initially prestacked together using suitable mechanical clamps represented by the clamping forces $F_c$ and suitably positioned on a conventional carriage 12 having longitudinal (L) and transverse (T) movement capability effected in any suitable and conventional manner known to those skilled in the art.

Each of the laminations 10 has an edge 10e which extends around the perimeter thereof, with the laminations 10 being stacked edge-to-edge, with the adjacent, abutting surfaces thereof defining respective kerfs 14 therebetween.

The stacked laminations 10 on the carriage 12 are suitably positioned adjacent to a conventional pulsed laser 16 which may, for example, be a conventional neodymium-yttrium-aluminum-garnet (Nd:YAG) laser. A suitable pulsed YAG-type laser may be obtained from Raytheon Company. The laser 16 is effective for emitting a pulsed laser beam 18 which is used in accordance with the present invention for welding together the stacked laminations 10. In order to reduce oxidation during the welding process, conventional means in the form of a gas nozzle 20 and a conventional gas supply 22 suitably connected thereto are provided for channeling an inert gas 24 such as argon or nitrogen over the weld area.

As shown in FIG. 1, the welding process in accordance with one embodiment of the present invention includes positioning an edge 10e such as the first edge of the stack of laminations 10, adjacent to the pulsed laser 16 and then aligning a subject one of the kerfs 14 relative to the laser 16 for receiving the laser beam 18 therefrom at the subject kerf 14. Of course, the welding process may begin at any desired one of the kerfs 14, and as shown in FIG. 1 for an exemplary weld bead 26 may be begun at one end of the stack and proceed to the opposite end of the stack.

Figure 2:
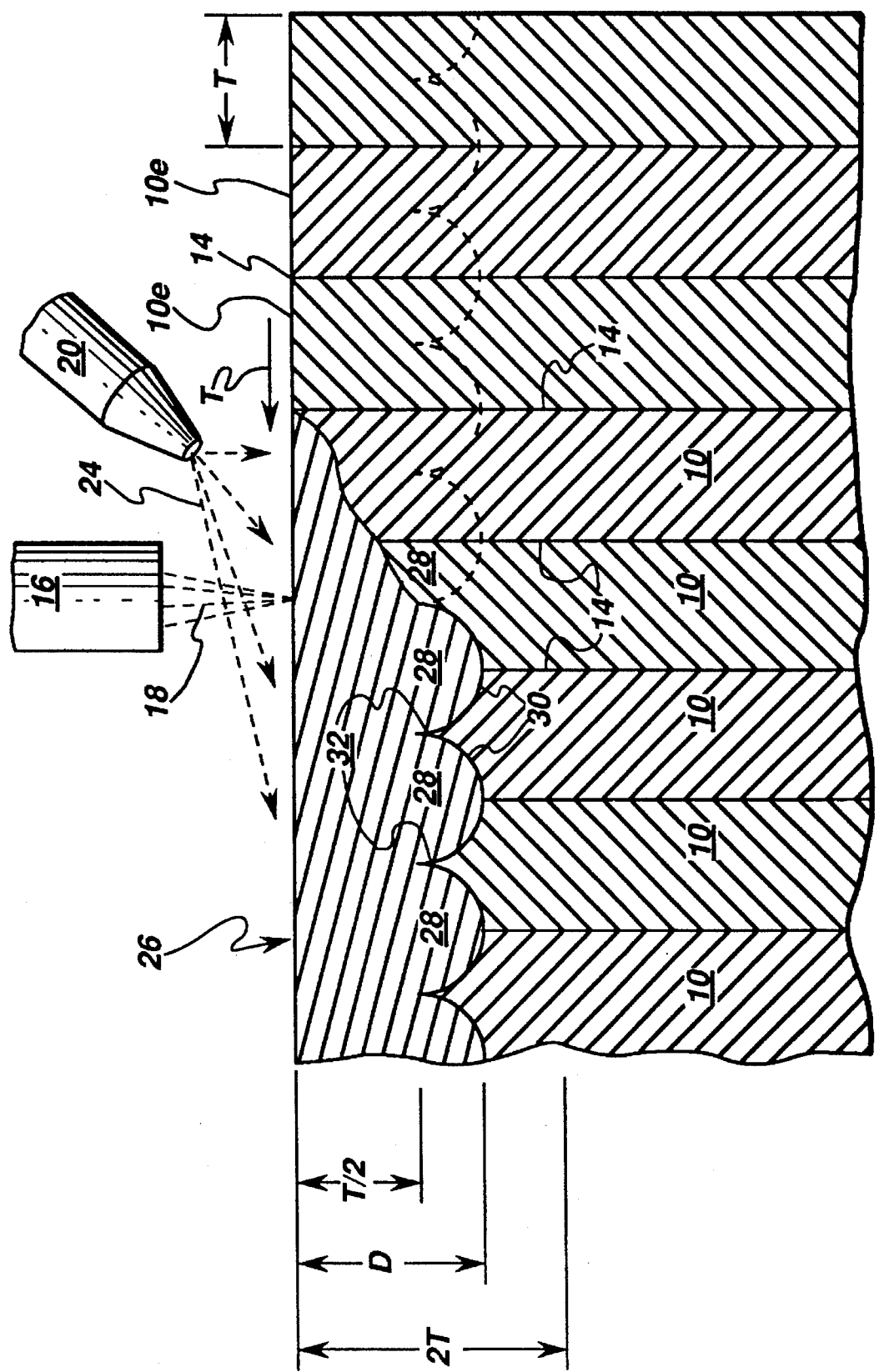
FIG. 2 is an enlarged, partly sectional schematic representation of a portion of the stacked laminations illustrated in FIG. 1 taken along line 2—2 during eh welding process.

FIG. 2 illustrates in more particularity the welding method in accordance with the present invention. As shown in FIG. 2 one of the center laminations 10 is positioned adjacent to the laser 16 with a desired one, or subject one, of the kerfs 14 being aligned relative to the laser 16 for receiving the pulsed laser beam 18 therefrom at the subject kerf 14. The laser 16 is then operated to direct the pulsed laser beam 18 at the subject kerf 14 for welding by melting the parent material of adjacent laminations 10 inwardly from the edge 10e at the subject kerf 14 to a predetermined maximum depth D. The laser is suitably controlled to limit the heat input at the subject kerf 14 for effecting a generally parabolic malting zone 28 shown in solid line for zones 28 already produced and shown in dashed line for succeeding zones 28 to be produced. Since the laser beam 18 is directed at the kerf 14, the melting zone 28 is generally symmetrical and bridges the adjacent laminations 10 at the subject kerf 14, and thusly forms a complementary parabolic unmelted or nonmelted heat affected zone 30 bounding the melting zone 28 from below.

In the exemplary embodiment illustrated in FIG. 2 wherein the laser 16 remains stationary, the stack of laminations 10 is moved transversely edge-to-edge in the T-direction relative to the pulsed laser beam 18 for aligning a next adjacent kerf 14 therewith, and repeating the steps of operating and controlling the laser 16 described above for the adjacent kerf 14 to create successive parabolic melting zones 28 and corresponding unmelted heat affected zones 30. As shown in FIG. 2, the welding process has already occurred at several successive kerfs 14 so that the adjacent heat affected zones 30 create respective cusps 32 of nonmelted or unmelted parent material between the adjacent parabolic melting zones 28. The cusps 32 face outwardly toward the lamination edges 10e, and in the embodiment illustrated in FIG. 2 extend only partially into the adjacent melting zones 28 which therefore form a continuous weld bead 26 transversely across the laminations 10.

A suitably YAG-type laser 16 should have a power density of about $10^5$–$10^6$ watts per square centimeter for effective welding of the laminations 10 with a pulse length variable between about 5–20 milliseconds. For a given predetermined power density of the laser 16, the pulse length of the laser beam 18 may be adjusted to effect the parabolic melting zones 28 and cusps 32 therebetween. By welding the laminations 10 at the kerfs 14 between adjacent ones of the laminations 10, the welding process occurs from the lamination side surface and progresses laterally toward the middle of the lamination as well as inwardly from the edge 10e. By operating the laser 16 as described above to control the pulse length, the heat input into the laminations 10 may be limited to relative low values sufficient for melting the parent material just enough for joining together adjacent laminations without using excessive heat which would melt also the cusps 32 which is not required for obtaining a suitable weld. By repeating the welding steps at each successive kerf 14, a continuous weld beam 26 may be produced transversely across the laminations 10. The laminations 10 will also have a continuous heat affected zone 30 from lamination to lamination of unmelted parent material configured in the form of a plurality of cusps 32 interconnected at the kerfs 14 and extending into the weld bead 26 between adjacent ones of the kerfs 14. The junctures of the interconnected cusps 32 occurs generally at the middle of each lamination 10.

Referring again to FIG. 2, the laser 16 is preferably operated to control the heat input into the laminations 10 so that the maximum weld depth is greater than or equal to about one-half (½) lamination thickness T and less than about two (2) lamination thicknesses 2 T, with an exemplary thickness T of about 0.5 mm. As shown in FIG. 1, the width W of the weld bead 26 similarly falls within this range of being greater than or equal to about one-half lamination thickness T/2 and less than about two lamination thicknesses 2 T. During the welding process, the inert gas 24 as illustrated in FIG. 2 is suitably channeled over the melting zone 28 for reducing oxidation thereof during welding as is conventionally known.

Since the welding process described above merely melts some of the parent lamination material and limits the maximum depth thereof, the top of the weld bead 26 itself remains substantially flush with the edges 10e of the laminations 10 which therefore eliminates any pulsed machining which would otherwise be required for providing a flush surface for use in a corresponding electrical device. Also as illustrated in FIG. 2, the weld bead 26 formed upon cooling and solidification of the melting zones 28 is continuous transversely across the adjacent laminations 10 at a depth less than about one (1) lamination thickness. The bottom of the weld bead 26 is formed by the interconnected cusps 32 which provide an undulating or wave-shaped boundary between the solidified weld bead 26 and the never melted parent material in the adjoining heat affected zones 30.

The resulting joined together laminations 10 therefore are subject to less thermal distortion thereof and less degradation of the magnetic properties thereof. By minimizing the heat input during the weld process, the need for any pulsed heat treatment for restoring magnetic properties and reducing residual stresses is diminished.

As shown in FIGS. 1, additional weld beads 26 may be formed at other locations around the perimeter of the stacked laminations 10 as desired for suitably structurally joining together the laminations 10. The stacked laminations 10 are repositioned as required on the carriage 12 in order to form the required weld beads 26 using the stationary laser 16. Since it is common to maintain a welding laser, such as the laser 16, in a stationary position, multiple welding may occur by using conventional fiber optic bundles for delivering individual laser beams 18 from a common laser 16 if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. An article comprising:

a stack of laminations having abutting adjacent surfaces defining respective kerfs;

a weld bead extending transversely from edge-to-edge along said laminations for fixedly joining together said laminations;

said weld bead having a maximum depth at said kerfs greater than or equal to about one-half (½) lamination thickness and less than about two (2) lamination thicknesses; and said laminations having a continuous heat affected zone of unmelted material configured in the form of a plurality of cusps interconnected at said kerfs and extending into said weld bead between adjacent ones of said kerfs.

2. An article according to claim 1 wherein said weld bead is substantially flush with said lamination edges.

3. An article comprising:

a plurality of laminations having substantially identical configurations, said laminations arranged in a stack and having abutting adjacent surfaces defining respective kerfs; and a weld bead extending transversely along the edges of said laminations for fixedly joining together said laminations, said weld bead being substantially flush with the edges of said laminations and having a maximum depth at said kerfs which is in the range of about one-half to two times the thickness of one of said laminations, said laminations having a continuous heat affected zone of unmelted material configured in the form of a plurality of cusps interconnected at said kerfs and extending into said weld bead between adjacent ones of said kerfs.

* * * * *